(12) United States Patent
Shibata et al.

(10) Patent No.: US 10,181,607 B2
(45) Date of Patent: Jan. 15, 2019

(54) GAS FLOW PASSAGE-FORMING MEMBER AND CELL FOR FUEL CELL

(71) Applicants: TOYOTA JIDOSHA KABUSHIKI KAISHA, Toyota-shi, Aichi-ken (JP); TOYOTA SHATAI KABUSHIKI KAISHA, Kariya-shi, Aichi-ken (JP)

(72) Inventors: Kazunori Shibata, Mishima (JP); Hiroya Nakaji, Toyota (JP); Hiroki Okabe, Okazaki (JP); Yoshinori Shinozaki, Toyota (JP); Kousuke Kawajiri, Okazaki (JP); Satoshi Futami, Toyota (JP); Takamasa Kanie, Toukai (JP)

(73) Assignees: Toyota Jidosha Kabushiki Kaisha, Toyota-shi, Aichi-ken (JP); Toyota Shatai Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/660,085

(22) Filed: Jul. 26, 2017

(65) Prior Publication Data

US 2018/0034079 A1   Feb. 1, 2018

(30) Foreign Application Priority Data

Jul. 28, 2016  (JP) ................................ 2016-148922
Jul. 5, 2017   (JP) ................................ 2017-131797

(51) Int. Cl.
*H01M 8/0254*  (2016.01)
*H01M 8/04119* (2016.01)
(Continued)

(52) U.S. Cl.
CPC ..... *H01M 8/04149* (2013.01); *H01M 8/0202* (2013.01); *H01M 8/026* (2013.01);
(Continued)

(58) Field of Classification Search
None
See application file for complete search history.

(56) References Cited

U.S. PATENT DOCUMENTS

2010/0104912 A1* 4/2010 Ogawa ................ H01M 8/0245
429/435
2015/0221958 A1   8/2015 Hashimoto et al.
(Continued)

FOREIGN PATENT DOCUMENTS

EP  3 133 685 A1  2/2017
JP  2009-26476   2/2009
(Continued)

*Primary Examiner* — Lucas J. O'Donnell
(74) *Attorney, Agent, or Firm* — Finnegan, Henderson, Farabow, Garrett & Dunner, LLP

(57) ABSTRACT

A gas flow passage-forming member is disposed between a membrane electrode and gas diffusion layer assembly and a separator of a fuel cell, and the gas flow passage-forming member is configured to form a gas flow passage. The gas flow passage-forming member has a corrugated shape such that groove portions and ridge portions are provided on each of a front side and a back side of the gas flow passage-forming member. The groove portions each serve as the gas flow passage. The gas flow passage-forming member has communication holes providing communication between the front side and the back side, and the communication holes are provided in a region downstream of an upstream region in a gas flow direction. The upstream region is a non-communication region with no communication hole.

5 Claims, 6 Drawing Sheets

(51) Int. Cl.
*H01M 8/0202* (2016.01)
*H01M 8/026* (2016.01)
*H01M 8/1004* (2016.01)
*H01M 8/0258* (2016.01)
*H01M 8/0206* (2016.01)
*H01M 8/1018* (2016.01)

(52) U.S. Cl.
CPC ....... *H01M 8/0254* (2013.01); *H01M 8/0258* (2013.01); *H01M 8/04156* (2013.01); *H01M 8/1004* (2013.01); *H01M 8/0206* (2013.01); *H01M 2008/1095* (2013.01)

(56) References Cited

U.S. PATENT DOCUMENTS

2015/0236368 A1　8/2015　Hashimoto et al.
2017/0054156 A1*　2/2017　Kawajiri ............. H01M 8/2457

FOREIGN PATENT DOCUMENTS

| JP | 2011-44399 | 3/2011 |
| JP | 2011-165559 | 8/2011 |
| JP | 2014-167860 | 9/2014 |
| JP | 2014-167861 | 9/2014 |

* cited by examiner

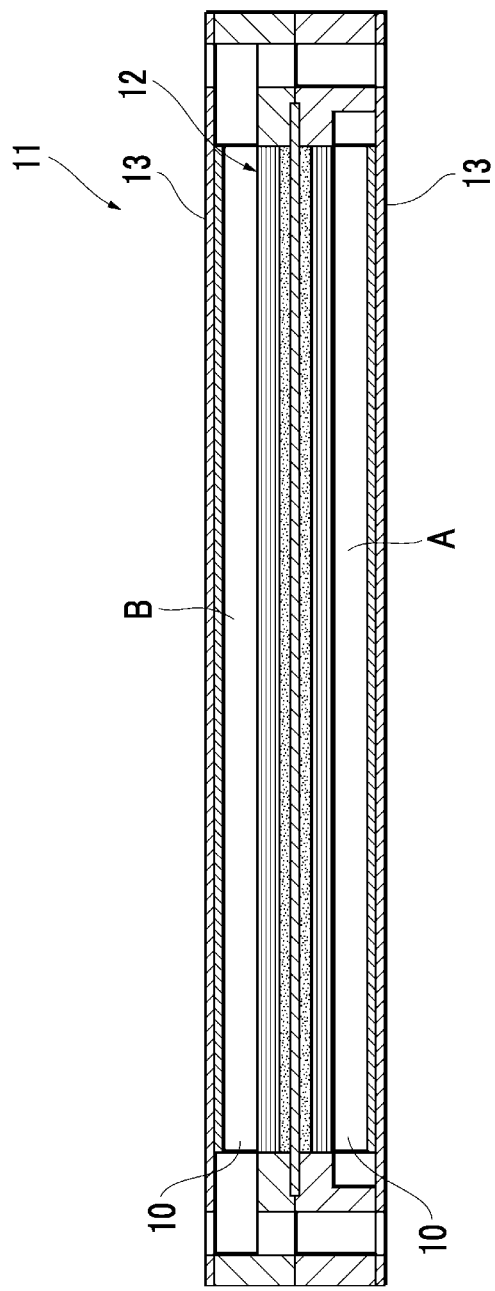

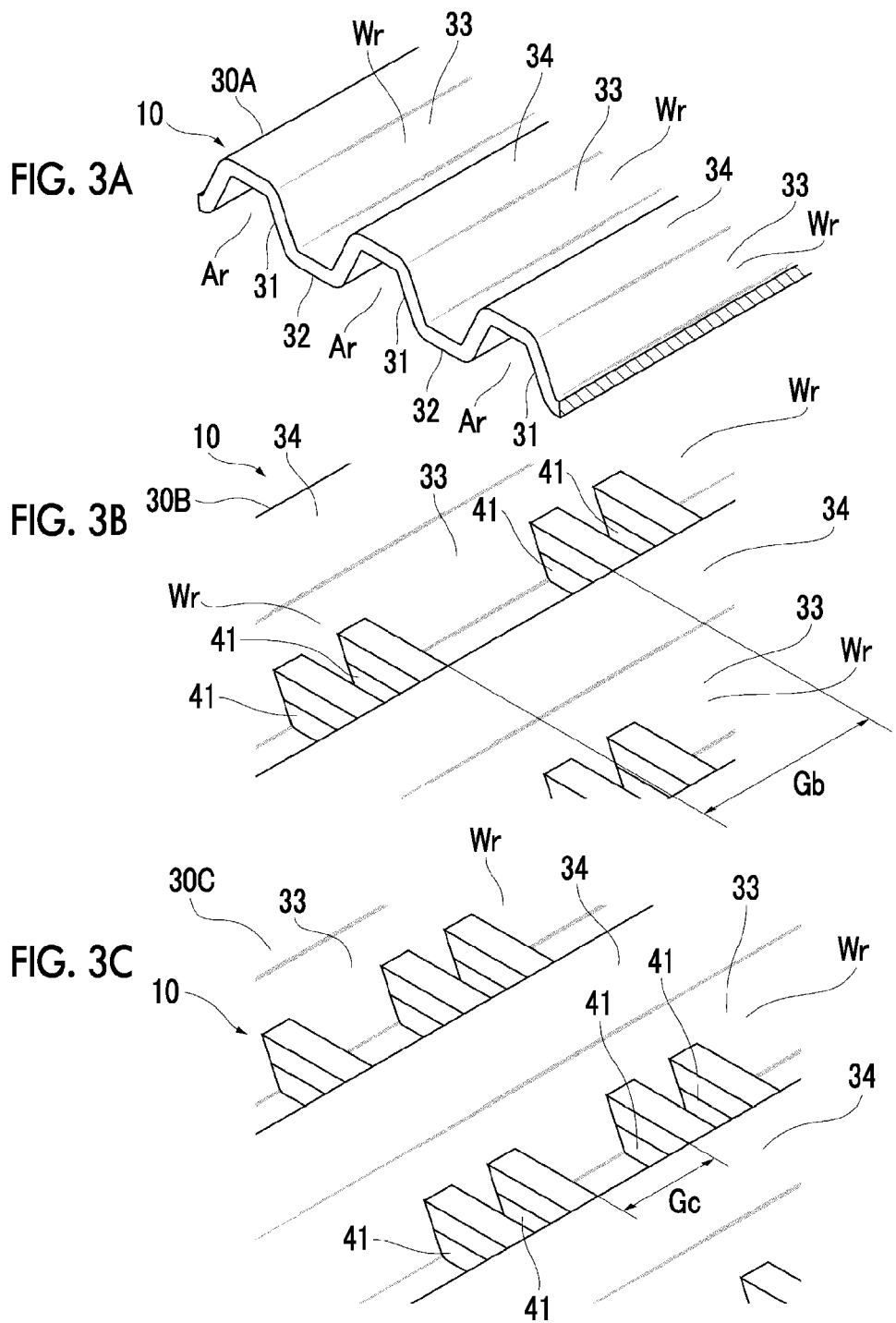

GAS FLOW PASSAGE-FORMING MEMBER AND CELL FOR FUEL CELL

INCORPORATION BY REFERENCE

The disclosure of Japanese Patent Application No. 2017-131797 filed on Jul. 5, 2017 including the specification, drawings and abstract is incorporated herein by reference in its entirety.

BACKGROUND

1. Technical Field

The disclosure relates to a gas flow passage-forming member, and relates also to a cell for a fuel cell.

2. Description of Related Art

As a cell for a fuel cell, there is a known cell including a membrane electrode and gas diffusion layer assembly (hereinafter, referred to as "MEGA" where appropriate), separators, and gas flow passage-forming members disposed between the MEGA and the separators (refer to, for example, Japanese Patent Application Publication No. 2011-44399 (JP 2011-44399 A)).

SUMMARY

In the cell including the gas flow passage-forming members, generated water generated in the MEGA can be appropriately drained. However, during a high-temperature operation of the fuel cell, the generated water is excessively drained and thus the MEGA easily dries up.

In view of this, in the cell having the above-described configuration, a flat plate portion provided in the gas flow passage-forming member is brought into close contact with the MEGA, on the upstream side in the airflow direction, where the MEGA easily dries up. However, when the flat plate portion is brought into close contact with the MEGA as described above, the power generation efficiency at a region, where the flat plate portion is in close contact with the MEGA, decreases and thus the amount of electric power generated by the cell decreases.

The disclosure provides a gas flow passage-forming member and a cell for a fuel cell, the gas flow passage-forming member and the cell being configured to suppress drying-up of an MEGA without decreasing the power generation efficiency, and configured to ensure appropriate drainage performance.

A first aspect of the disclosure relates to a gas flow passage-forming member that is disposed between a membrane electrode and gas diffusion layer assembly (MEGA) and a separator that constitute a cell for a fuel cell, and that is configured to form a gas flow passage. The gas flow passage-forming member has a corrugated shape such that recessed portions and protruding portions are provided on each of a front side and a back side of the gas flow passage-forming member. The recessed portions on the front side each serve as the gas flow passage. The gas flow passage-forming member has a communication hole providing communication between the front side of the gas flow passage-forming member and the back side of the gas flow passage-forming member, and the communication hole is provided in a region downstream of an upstream region in a gas flow direction, the region including a midstream region and a downstream region. The upstream region is a non-communication region with no communication hole.

In the gas flow passage-forming member, the communication hole is provided in the midstream region and the further downstream region in the gas flow direction, and the upstream region is a non-communication region. Thus, the flow of generated water generated in the MEGA during power generation can be controlled in a manner that differs between the upstream region, and the midstream region and the further downstream region. Thus, in the upstream region that is the non-communication region with no communication hole, it is possible to suppress drying-up of the MEGA without hindering the flow of the gas. In the midstream region and the further downstream region, it is possible to ensure appropriate generated-water drainage performance. As a result, it is possible to ensure appropriate power generation efficiency throughout the entire region of the MEGA, thereby increasing the power generation amount.

With the gas flow passage-forming member according to the first aspect of the disclosure, it is possible to suppress drying-up of the MEGA without decreasing the power generation efficiency, and to ensure appropriate drainage performance.

A second aspect of the disclosure relates to a cell for a fuel cell including an MEGA, a separator, and the gas flow passage-forming member according to the first aspect, which is disposed between the MEGA and the separator.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a sectional view schematically illustrating a cell for a fuel cell stack;

FIG. 3A is a view illustrating the shape of an upstream region of the gas flow passage-forming member;

FIG. 3B is a view illustrating the shape of a midstream region of the gas flow passage-forming member;

FIG. 3C is a view illustrating the shape of a downstream region of the gas flow passage-forming member;

DETAILED DESCRIPTION OF EMBODIMENTS

Figure 2A:
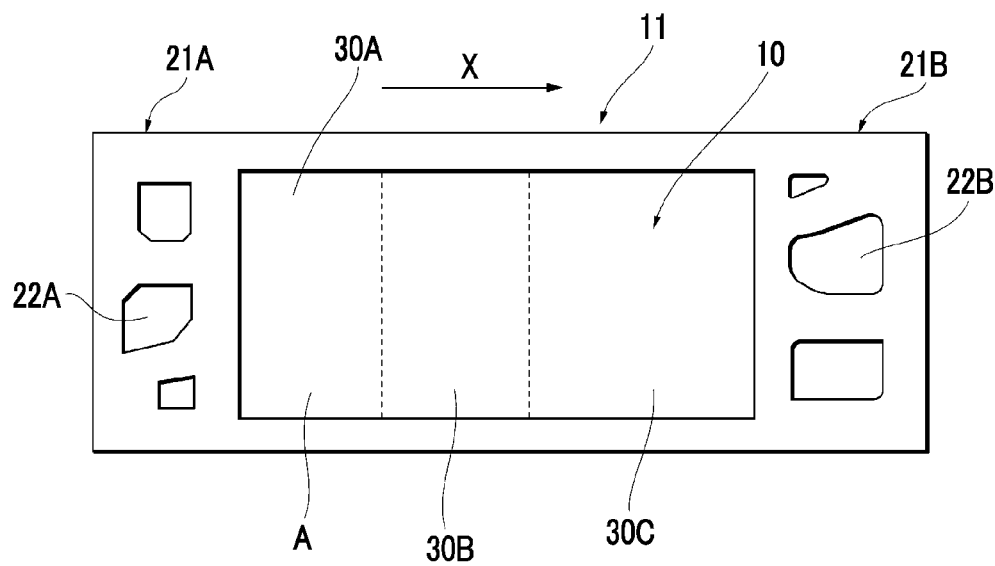
FIG. 2A is a front view schematically illustrating a gas flow passage-forming member according to an example embodiment.

Hereinafter, a gas flow passage-forming member according to an embodiment of the disclosure will be described with reference to the accompanying drawings. FIG. 1 is a sectional view schematically illustrating a cell for a fuel cell stack.

As illustrated in FIG. 1, gas flow passage-forming members 10 according to the present embodiment are provided in a cell 11 for a fuel cell stack. The cell 11 includes a membrane electrode and gas diffusion layer assembly (hereinafter, referred to as "MEGA") 12 and separators 13. One of the separators 13 is provided on one side of the MEGA 12, and the other one of the separators 13 is provided on the other side of the MEGA 12. In the MEGA 12, a catalyst layer and a diffusion layer are provided on each of two sides of a membrane electrode assembly (MEA). The gas flow passage-forming member 10 is a member for forming a three-dimensional fine mesh flow passage (referred also to as "3D fine mesh flow passage"). The gas flow passage-forming member 10 is disposed between the MEGA 12 and each separator 13. The gas flow passage-forming member 10 is made of, for example, ferritic stainless steel (SUS), a titanium alloy, carbon, a gold-plated titanium alloy, or a gold alloy. The gas flow passage-forming member 10 may be made of a porous material.

In the cell 11, one of the gas flow passage-forming members 10 forms an air electrode A on one side of the MEGA 12, the other one of the gas flow passage-forming members 10 forms a fuel electrode B on the other side of the MEGA 12. A pair of the separators 13 is provided such that the air electrode A and the fuel electrode B are sandwiched by the separators 13. Air serving as oxidation gas is supplied to the air electrode A of the cell 11, and hydrogen gas serving as fuel gas is supplied to the fuel electrode B of the cell 11. Then, an electrochemical reaction between air and hydrogen occurs in the MEGA 12 of the cell 11, whereby electric power is generated.

Figure 2B:
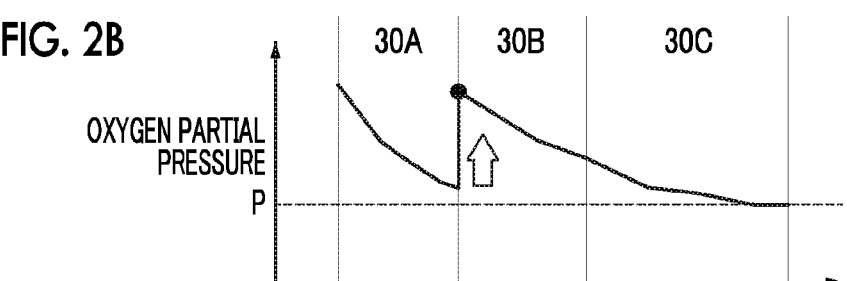
FIG. 2B is a graph indicating an oxygen partial pressure (air partial pressure) in each of regions of the gas flow passage-forming member.
Figure 2C:
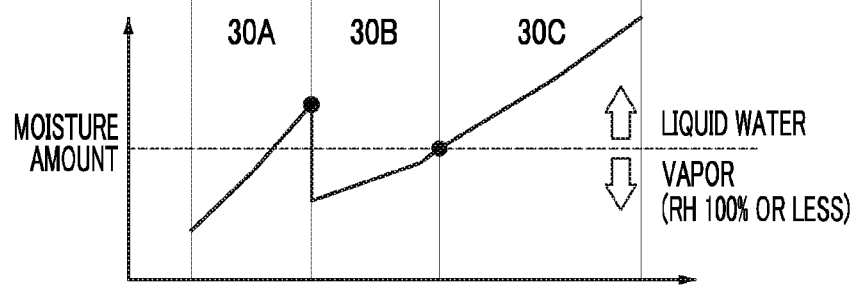
FIG. 2C is a graph indicating a moisture amount in each of the regions of the gas flow passage-forming member.

FIG. 2A is a front view schematically illustrating the gas flow passage-forming member 10 according to the present embodiment. FIG. 2B is a graph indicating an oxygen partial pressure (air partial pressure) in each of regions of the gas flow passage-forming member 10. FIG. 2C is a graph indicating a moisture amount in each of the regions of the gas flow passage-forming member 10.

As illustrated in FIG. 2A, the cell 11 has a manifold 21A at one end, and a manifold 21B at the other end. Air is supplied to the air electrode A of the cell 11 through an air inlet 22A of the manifold 21A, and is discharged through an air outlet 22B of the manifold 21B. Thus, in the air electrode A, the air flows from the manifold 21A toward the manifold 21B (in the direction of an arrow X in FIG. 2A). The gas flow passage-forming member 10 provided at the air electrode A is divided into a plurality of regions in the airflow direction. Specifically, an upstream portion of the gas flow passage-forming member 10 in the airflow direction is an upstream region 30A, a midstream portion thereof in the airflow direction is a midstream region 30B, and a downstream portion thereof in the airflow direction is a downstream region 30C.

FIG. 3A is a view illustrating the shape of the upstream region 30A of the gas flow passage-forming member 10. FIG. 3B is a view illustrating the shape of the midstream region 30B of the gas flow passage-forming member 10. FIG. 3C is a view illustrating the shape of the downstream region 30C of the gas flow passage-forming member 10.

As illustrated in FIG. 3A to FIG. 3C, the gas flow passage-forming member 10 has a plurality of groove portions (recessed portions) 31 extending in the airflow direction and arranged parallel to one another. The groove portions 31 are provided on a surface of the gas flow passage-forming member 10, which faces the MEGA 12. Ridge portions (protruding portions) 32 protruding toward the MEGA 12 are provided between the groove portions 31. In the gas flow passage-forming member 10, the back side of each ridge portion 32 is a groove portion (recessed portion) 33, and the back side of each groove portion 31 is a ridge portion (protruding portion) 34 protruding toward the separator 13. The ridge portions 32 of the gas flow passage-forming member 10 are brought into contact with the MEGA 12, and the ridge portions 34 of the gas flow passage-forming member 10 are brought into contact with the separator 13. Thus, the cell 11 is provided with gas flow passages Ar, through which the air flows, and drainage passages Wr. The gas flow passages Ar are formed on a surface of the MEGA 12 by the groove portions 31 of the gas flow passage-forming member 10, which are provided on the MEGA 12-side. The drainage passages Wr are formed on a surface of the separator 13 by the groove portions 33 of the gas flow passage-forming member 10, which are provided on the separator 13-side.

As illustrated in FIG. 3B and FIG. 3C, the gas flow passage-forming member 10 is provided with communication holes 41 that provide communication between the front side and the back side of the gas flow passage-forming member 10. The communication holes 41 are provided in the midstream region 30B and a further downstream region of the gas flow passage-forming member 10, excluding the upstream region 30A. In other words, the communication holes 41 are provided in the midstream region 30B and the downstream region 30C. The communication holes 41 are provided in pairs. A distance Gc between a pair of the communication holes 41 and an adjacent pair of the communication holes 41 in the downstream region 30C is shorter than a distance Gb between a pair of the communication holes 41 and an adjacent pair of the communication holes 41 in the midstream region 30B. Thus, the number of the communication holes 41 per unit area is larger in the downstream region 30C than in the midstream region 30B.

Figure 4:
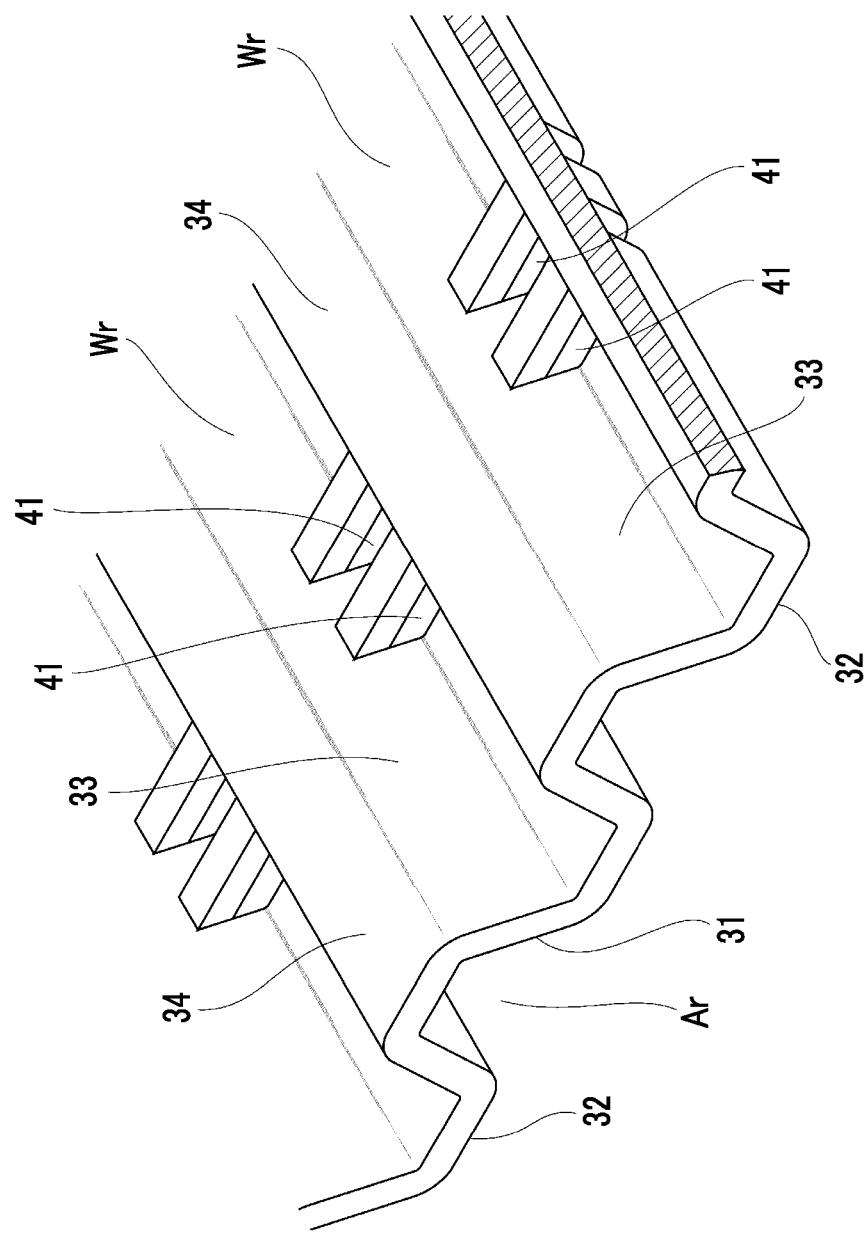
FIG. 4 is a perspective view illustrating a region of the gas flow passage-forming member, where communication holes are provided.
Figure 5:
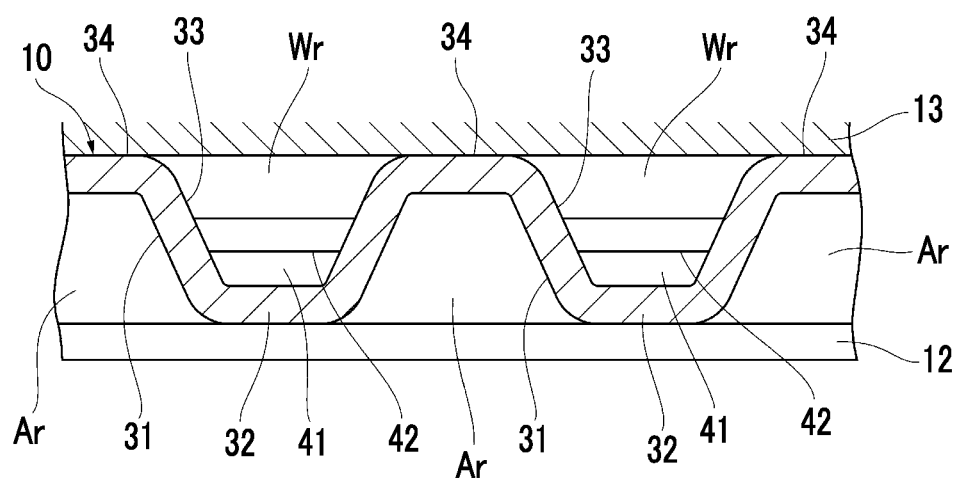
FIG. 5 is a view schematically illustrating the region of the gas flow passage-forming member, where the communication holes are provided, FIG. 5 being a sectional view taken in the width direction of a cell.

FIG. 4 is a perspective view illustrating a region of the gas flow passage-forming member 10, where the communication holes 41 are provided. FIG. 5 is a view schematically illustrating the region of the gas flow passage-forming member 10, where the communication holes 41 are provided. FIG. 5 is a sectional view taken in the width direction of the cell 11.

As illustrated in FIG. 4 and FIG. 5, in the midstream region 30B and the downstream region 30C of the gas flow passage-forming member 10, recesses 42 are formed in the ridge portions 32 provided between the groove portions 31 and protruding toward the MEGA 12. Thus, the communication holes 41 in the form of a slit are provided between bottom portions of the recesses 42 and bottom portions of the groove portions 33 that are provided on the separator 13-side.

In the gas flow passage-forming member 10 having the communication holes 41, generated water SW generated in the MEGA 12 during power generation is drawn up by capillary action in the communication holes 41 in the form of a silt, is then introduced into the drainage passages Wr formed by the groove portions 33 provided on the separator 13-side, and is finally drained.

In the gas flow passage-forming member 10 having the above-described configuration, the upstream region 30A is a non-communication region with no communication holes 41. Thus, in the air electrode A of the cell 11, a space on the MEGA 12-side and a space on the separator 13-side are separated from each other by the gas flow passage-forming member 10 in the upstream region 30A with no communication holes 41. Thus, in the upstream region 30A, the air is supplied to only the MEGA 12-side, and the carried-away amount of vapor of the generated water generated in the MEGA 12 is limited, whereby the moisture amount increases toward a downstream-side end portion of the upstream region 30A and the saturated water vapor pressure is reached (refer to the graph of the moisture amount in FIG. 2C). The range of the upstream region 30A is set to a range in which the oxygen partial pressure (air partial pressure) at the downstream-side end portion of the upstream region 30A does not fall below the oxygen partial pressure (air partial pressure) P at a downstream-side outlet of the gas flow passage-forming member 10 (refer to the graph of the oxygen partial pressure (air partial pressure) in FIG. 2B).

In the midstream region 30B and the further downstream region that have the communication holes 41, due to the drainage function of the communication holes 41, the oxygen partial pressure (air partial pressure) temporarily increases and then gradually decreases (refer to the graph of the oxygen partial pressure (air partial pressure) in FIG. 2B), and the moisture amount in the air temporarily decreases and then gradually increases (refer to the graph of the moisture amount in FIG. 2C).

In the downstream region 30C, the number of the communication holes 41 is larger than that in the midstream region 30B, and thus migration of the generated water generated on the MEGA 12-side to the separator 13-side is promoted. The range of the downstream region 30C is set to a range downstream of a position at which liquid water is generated in the vapor of the generated water in the midstream region 30B and the further downstream region (refer to the graph of the moisture amount in FIG. 2C).

If a gas flow passage-forming member having the communication holes 41 that are evenly provided throughout the entire region from the upstream region 30A to the downstream region 30C is used as the gas flow passage-forming member 10, the in-plane moisture state of the MEGA 12 significantly varies from an upstream-side region to a downstream-side region. This is one of the factors in the performance deterioration. That is, in the upstream-side region of the MEGA 12, the amount of generated water is small, and thus the MEGA 12 is excessively dried due to the drainage performance of the gas flow passage-forming member 10 and the MEGA 12 easily dries up. On the other hand, in the downstream-side region of the MEGA 12, the generated water is not appropriately drained, and the power generation efficiency decreases due to the generated water adhering to the surface of the MEGA 12.

In contrast to this, according to the present embodiment, the communication holes 41 are provided in the midstream region 30B and the further downstream region in the airflow direction, and the upstream region 30A is a non-communication region. Thus, the flow of generated water generated in the MEGA 12 during power generation can be controlled in a manner that differs between the upstream region 30A, and the midstream region 30B and the further downstream region. Thus, in the upstream region 30A, it is possible to suppress drying-up of the MEGA 12 without hindering the flow of the air. In the midstream region 30B and the further downstream region, it is possible to ensure appropriate generated-water drainage performance. As a result, it is possible to ensure appropriate power generation efficiency throughout the entire region of the MEGA 12, thereby increasing the power generation amount.

More specifically, a plurality of the communication holes 41 is provided in the midstream region 30B and the downstream region 30C in the airflow direction, and the distance Gc between a pair of the communication holes 41 and an adjacent pair of the communication holes 41 in the downstream region 30C is shorter than the distance Gb between a pair of the communication holes 41 and an adjacent pair of the communication holes 41 in the midstream region 30B. Thus, in the midstream region 30B and the downstream region 30C in which flooding is likely to occur, appropriate generated-water drainage performance is ensured by the communication holes 41. Further, the drainage performance in the downstream region 30C is higher than that in the midstream region 30B. As a result, it is possible to further suppress the variations in the moisture amount in the entire region of the MEGA 12, thereby improving the power generation performance.

As described above, when the gas flow passage-forming member 10 according to the present embodiment is used, it is possible to control the state of moisture facing the MEGA 12, thereby maintaining the appropriate moisture retaining state and the appropriate oxygen partial pressure (air partial pressure). Thus, it is possible to appropriately maintain the output from the cell 11 and temperature of the cell 11, while suppressing, for example, drying-up of the MEGA 12 during high-temperature operation.

Note that, the manner for controlling the drainage performance in the communication holes 41 of the gas flow passage-forming member 10 is not limited to adjustment of the number of the communication holes 41.

Figure 6A:
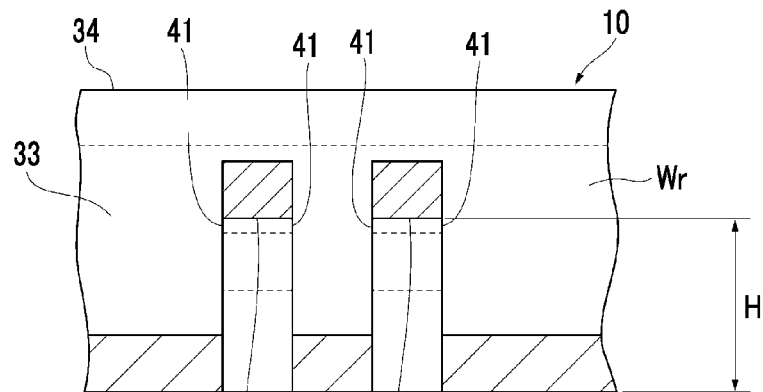
FIG. 6A is a view schematically illustrating a method for adjusting the capillary attraction in the communication holes, FIG. 6A being a sectional view taken in the gas flow direction.
Figure 6B:
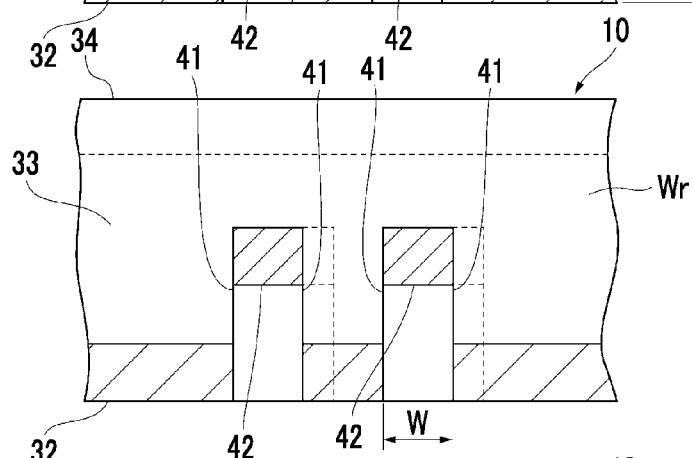
FIG. 6B is a view schematically illustrating a method for adjusting the capillary attraction in the communication holes, FIG. 6B being a sectional view taken in the gas flow direction.
Figure 6C:
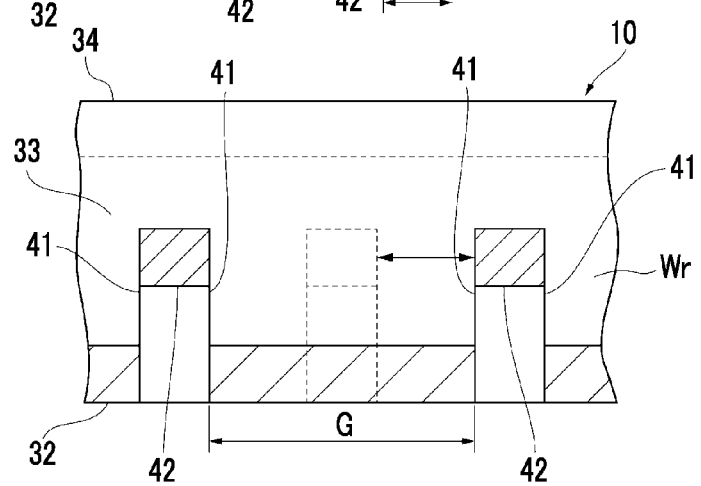
FIG. 6C is a view schematically illustrating a method for adjusting the capillary attraction in the communication holes, FIG. 6C being a sectional view taken in the gas flow direction.

The drainage performance may be controlled by adjusting the capillary attraction in the communication holes 41, for example, as illustrated in FIG. 6A and FIG. 6B. As illustrated in FIG. 6A, the drainage performance may be controlled by increasing or decreasing a height H of the recesses 42 for forming the communication holes 41. As illustrated in FIG. 6B, the drainage performance may be controlled by increasing or decreasing a width W of the recesses 42 for forming the communication holes 41. For example, the width W of the communication hole 41 in the downstream region 30C is set to be smaller than the width W of the communication hole 41 in the midstream region 30B. As illustrated in FIG. 6C, for example, in the midstream region 30B and the downstream region 30C, preferably, the capillary action is suppressed by increasing a distance G between the communication holes 41 in a region where the MEGA 12 is easily dried and the capillary action is improved by decreasing the distance G between the communication holes 41 in a region where the MEGA 12 is not easily dried.

In the foregoing embodiment, the air electrode A in which the air flows has been described. However, it is needless to say that the disclosure is applicable to the fuel electrode B in which hydrogen flows.

The description of the foregoing embodiment will be summarized as follows. The gas flow passage-forming member is a gas flow passage-forming member disposed between an MEGA and a separator that constitute a cell for a fuel cell and used to form a gas flow passage. The gas flow passage-forming member has a corrugated shape, that is, the gas flow passage-forming member has recessed portions and protruding portions on the front side and the back side. The recessed portions serve as gas flow passages. The gas flow passage-forming member has communication holes, which provide communication between the front side and the back side of the gas flow passage-forming member. The communication holes are provided in a region including a midstream region and a downstream region, that is, a region downstream of an upstream region in the gas flow direction. The upstream region is a non-communication region with no communication holes.

The distance between the communication holes provided in the downstream region which is continuous with the midstream region may be shorter than the distance between the communication holes in the midstream region.

With this configuration, the drainage performance in the downstream region is higher than that in the midstream region. As a result, it is possible to suppress the variations in the moisture amount in the entire region, thereby improving the power generation performance.

The gas flow passage-forming member may have a plurality of communication passages having different heights from the MEGA.

With this configuration, in the midstream region and the downstream region, it is possible to control the drainage performance by adjusting the capillary action.

The gas flow passage-forming member may have a plurality of communication passages having different widths.

With this configuration, in the midstream region and the downstream region, it is possible to control the drainage performance by adjusting the capillary action.

A cell for a fuel cell provided with a gas flow passage-forming member includes a separator, an MEGA, and the gas flow passage-forming member provided between the separator and the MEGA. The gas flow passage-forming member has protruding portions protruding toward the MEGA and brought into contact with the MEGA, and recessed portions provided continuously with the protruding portions. The gas flow passage-forming member forms first flow passages, which are clearances between the recessed portions and the MEGA, and second passages, which are clearances between the protruding portions and the separator. In the cell for a fuel cell, the gas supplied from an inlet flows through the first flow passages and is discharged through an outlet, whereby electric power is generated. In the gas flow passage-forming member, in order to decrease the moisture amount which increases toward the downstream side in the upstream region of the first flow passages, a plurality of holes providing communication between the first flow passages and the second flow passages is provided in a region downstream of the upstream region.

With the cell for a fuel cell, the moisture in the first flow passages can migrate to the second flow passages with the use of the hole. Thus, it is possible to appropriately discharge the generated water generated in the MEGA, thereby suppressing deterioration of the power generation efficiency.

The holes may be provided so as to increase the partial pressure of the gas which decreases toward the downstream side in the upstream region.

Thus, the partial pressure of the gas which decreases in the upstream region is increased in the midstream region. Thus, it is possible to suppress deterioration of the power generation efficiency.

The holes may be provided such that the partial pressure of the gas at a downstream-side end portion of the upstream region does not fall below the partial pressure of the gas at the outlet.

Thus, even at the downstream-side end portion of the upstream region, the partial pressure of the gas which has decreased in the upstream region does not fall below the partial pressure of the gas at the outlet. Thus, it is possible to suppress deterioration of the power generation efficiency.

In the downstream region which is continuous with the midstream region, a plurality of holes providing communication between the first flow passages and the second flow passages may be provided, and the distance between the holes may be set to be shorter than that in the midstream region.

Thus, the drainage efficiency improves. Thus, it is possible to suppress deterioration of the power generation efficiency even when the saturation water vapor pressure is reached and liquid water is generated in the downstream region.

What is claimed is:

1. A gas flow passage-forming member disposed between a membrane electrode and gas diffusion layer assembly and a separator that constitute a cell for a fuel cell, the gas flow passage-forming member being configured to form a gas flow passage,
   wherein the gas flow passage-forming member has a corrugated shape such that recessed portions and protruding portions are provided on each of a front side and a back side of the gas flow passage-forming member,
   wherein the recessed portions on the front side each serve as the gas flow passage,
   wherein the gas flow passage-forming member has a communication hole providing communication between the front side of the gas flow passage-forming member and the back side of the gas flow passage-forming member, and the communication hole is provided in a region downstream of an upstream region in a gas flow direction, the region including a midstream region and a downstream region, and
   wherein the upstream region is a non-communication region with no communication hole.

2. The gas flow passage-forming member according to claim 1, wherein the gas flow passage-forming member has a plurality of the communication holes.

3. The gas flow passage-forming member according to claim 2,
   wherein a plurality of the communication holes is provided in each of the midstream region and the downstream region, and
   wherein a distance between the communication holes adjacent to each other in the downstream region is shorter than a distance between the communication holes adjacent to each other in the midstream region.

4. The gas flow passage-forming member according to claim 2, wherein a width of each of the communication holes in the downstream region is smaller than a width of each of the communication holes in the midstream region.

5. A cell for a fuel cell, the cell comprising:
   a membrane electrode and gas diffusion layer assembly;
   a separator; and
   the gas flow passage-forming member according to claim 1, the gas flow passage-forming member being provided between the membrane electrode and gas diffusion layer assembly and the separator.

* * * * *